US008571911B1

(12) United States Patent
Meyer et al.

(10) Patent No.: US 8,571,911 B1
(45) Date of Patent: Oct. 29, 2013

(54) FACILITY LIFE MANAGEMENT METHOD

(75) Inventors: Theodore A. Meyer, Harrison City, PA (US); Robert K. Perdue, Murrysville, PA (US); Warren H. Bamford, Pittsburgh, PA (US); Edward Terek, Irwin, PA (US); G. Gary Elder, Monroeville, PA (US); Joel Woodcock, Herminie, PA (US)

(73) Assignee: Westinghouse Electric Company LLC, Monroeville, PA (US)

( * ) Notice: Subject to any disclaimer, the term of this patent is extended or adjusted under 35 U.S.C. 154(b) by 4452 days.

(21) Appl. No.: 10/298,157

(22) Filed: Nov. 15, 2002

Related U.S. Application Data

(60) Provisional application No. 60/332,844, filed on Nov. 16, 2001.

(51) Int. Cl.
*G06Q 10/00* (2012.01)
(52) U.S. Cl.
USPC .......................... 705/7.12; 705/305; 705/7.26
(58) Field of Classification Search
USPC ..................................................... 705/7, 7.12
See application file for complete search history.

(56) References Cited

U.S. PATENT DOCUMENTS

| 5,132,920 | A * | 7/1992 | Bellows et al. ............... 702/184 |
| 5,210,704 | A | 5/1993 | Husseiny |
| 5,216,612 | A * | 6/1993 | Cornett et al. .................. 700/96 |
| 6,738,748 | B2 * | 5/2004 | Wetzer ......................... 705/7.21 |

| 2002/0013639 | A1 | 1/2002 | Fujishima et al. |
| 2002/0035495 | A1 | 3/2002 | Spira et al. |
| 2003/0120402 | A1 * | 6/2003 | Jaw ................................ 701/29 |

OTHER PUBLICATIONS

Vaurio, J.K. "On time-dependent availability and maintenance optimization of standby units under various maintenance policies." Reliability Engineering and System Safety. 56 (1997): pp. 79-89.*
Basu, Sanjib et al. "Bayesian analysis for masked system failure data using non-identical Weibull models." Journal of Statistical Planning and Inference. 78 (1999): pp. 255-275.*
Oh, Y.S., et al. "Field data analyses with additional after-warranty failure data." Reliability Engineering and System Safety. 72 (2001): pp. 1-8.*

(Continued)

*Primary Examiner* — Andre Boyce
(74) *Attorney, Agent, or Firm* — Richard J. Coldren; Westinghouse Electric Company, LLC (57) ABSTRACT

An improved method of selecting and planning the performance of various maintenance activities on a facility such as a nuclear power plant includes determining the net present value of a number of future net savings that are expected to result from performance of the maintenance activity at a given time, and selecting and planning the maintenance activities in a fashion that maximizes net present value. The method includes, for each of a number of components and a number of time periods, determining a change in the probability that a component will fail within a time period, with the change resulting from an assumption that a maintenance activity is performed. The change in probability is multiplied with the losses associated with a failure in order to determine a gross savings from which costs are subtracted to determine net savings. The probabilities of failure may be determined from a probability failure model that has been derived from multiple sets of failure data that are characterized by Weibull distributions and are mathematically combined according to Bayes' Theorem. The maintenance activities may also be optimized according to a number of budget figures. An apparatus for performing the method is also disclosed.

42 Claims, 6 Drawing Sheets

| 1 | 2 | 3 | 4 | 5 | 6 | 7 | 8 | 9 | 10 | 11 | 12 |
|---|---|---|---|---|---|---|---|---|----|----|----|
| Age (EFPY) | Change in Prob. of Failure | EV Avoided Outage Hrs/Yr | EV Annual MWHR Gain | EV Net Revenue Gain ($K savings) | EV Expense Avoided ($K savings) | EV Preventive Exp. ($K savings) | EV Operating Cash Flow ($K) | EV Change in Capital ($K) | Taxes ($K) | PV Tax Shield ($K) | EV Net Cash Flow ($K savings) |
| 1 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 |
| 5 | 0.0352 | 2.54 | 2860 | 56 | 5 | 42 | 19 | 6 | 8 | 2 | 7 |
| 6 | 0.0462 | 3.33 | 3751 | 73 | 7 | 0 | 80 | -0.3 | 33 | 0 | 47 |
| 7 | 0.0527 | 3.79 | 4278 | 83 | 9 | 0 | 92 | -0.4 | 38 | 0 | 54 |
| 8 | 0.0524 | 3.94 | 4446 | 86 | 9 | 0 | 95 | -0.4 | 39 | 0 | 56 |
| 9 | 0.0459 | 3.78 | 4259 | 83 | 9 | 0 | 92 | -0.4 | 38 | 0 | 54 |
| 10 | 0.0356 | 3.3 | 3728 | 72 | 8 | 0 | 80 | -0.3 | 33 | 0 | 47 |
| 11 | 0.0225 | 2.56 | 2893 | 56 | 7 | 0 | 63 | -0.3 | 26 | 0 | 37 |
| 12 | 0.0077 | 1.62 | 1825 | 35 | 4 | 0 | 39 | -0.2 | 16 | 0 | 23 |

(56) References Cited

OTHER PUBLICATIONS

Estes, Allen C., et al. "Minimum expected cost-oriented optimal maintenance planning for deteriorating structures." Reliability Engineering and System Safety. 73 (2001): pp. 281-291.*

Lofsten, Hans. "Management of industrial maintenance—economic evaluation of maintenance policies." International Journal of Operations and Production Management. vol. 19, Issue 7 (1999). pp. 716.*

Lofsten, Hans. "Measuring maintenance performance—in search for a maintenance productivity index." International Journal of Production Economics. vol. 63 (2000). pp. 47-58.*

Jayabalan, V., and Dipak Chaudhuri. "Cost Optimization of Maintenance Scheduling for a System with Assured Reliability." IEEE Transactions on Reliability 41:1 (1992) pp. 21-25.*

Lie, Chang Hoon, and Young Ho Chun. "An Algorithm for Preventive Maintenance Policy." IEEE Transactions on Reliability R-35:1 (1986) pp. 71-75.*

Nakagawa, Toshio. "Sequential Imperfect Preventive Maintenance Policies." IEEE Transactions on Reliability 37:3 (1988) pp. 295-298.*

Pham, Hoang, and Hongzhou Wang. "Imperfect Maintenance." European Journal of Operational Research 94 (1996) pp. 425-438.*

Usher, John S., et al. "Cost Optimal Preventive Maintenance and Replacement Scheduling." IIE Transactions 30 (1998) pp. 1121-1128.*

\* cited by examiner

| 1 | 2 | 3 | 4 | 5 | 6 | 7 | 8 | 9 | 10 | 11 | 12 |
|---|---|---|---|---|---|---|---|---|---|---|---|
| Age (EFPY) | Change in Prob. of Failure | EV Avoided Outage Hrs/Yr | EV Annual MWHR Gain | EV Net Revenue Gain ($K savings) | EV Expense Avoided ($K savings) | EV Preventive Exp. ($K savings) | EV Operating Cash Flow ($K) | EV Change in Capital ($K) | Taxes ($K) | PV Tax Shield ($K) | EV Net Cash Flow ($K savings) |
| 1 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 |
| 5 | 0.0352 | 2.54 | 2860 | 56 | 5 | 42 | 19 | 6 | 8 | 2 | 7 |
| 6 | 0.0462 | 3.33 | 3751 | 73 | 7 | 0 | 80 | -0.3 | 33 | 0 | 47 |
| 7 | 0.0527 | 3.79 | 4278 | 83 | 9 | 0 | 92 | -0.4 | 38 | 0 | 54 |
| 8 | 0.0524 | 3.94 | 4446 | 86 | 9 | 0 | 95 | -0.4 | 39 | 0 | 56 |
| 9 | 0.0459 | 3.78 | 4259 | 83 | 9 | 0 | 92 | -0.4 | 38 | 0 | 54 |
| 10 | 0.0356 | 3.3 | 3728 | 72 | 8 | 0 | 80 | -0.3 | 33 | 0 | 47 |
| 11 | 0.0225 | 2.56 | 2893 | 56 | 7 | 0 | 63 | -0.3 | 26 | 0 | 37 |
| 12 | 0.0077 | 1.62 | 1825 | 35 | 4 | 0 | 39 | -0.2 | 16 | 0 | 23 |

Fig. 3

| System/Sub-Sys. | NPV ($K) of Preventive Replacem't | Optimal Preventive & Predicted Corrective Aging Management Expenditures ($K): 2002-2048 | | | | | | |
|---|---|---|---|---|---|---|---|---|
| | | 2002-2003 | 2004-2005 | 2006-2007 | 2008-2009 | 2010-2011 | 2012-2028 | 2029-2048 |
| RV Internals | $135.5 | 0 | $0.0 | $0.0 | $0.0 | $0.0 | $11,024.4 | $45,688.6 |
| PRZ & Heaters | $141.3 | $386.0 | $0.0 | $0.0 | $0.0 | $0.0 | $1,335.1 | $4,570.3 |
| Reactor Vessel | $0.0 | $0.0 | $0.0 | $0.0 | $0.0 | $0.0 | $12,509.8 | $22,348.4 |
| RCS Valves | $3,562.3 | $2.2 | $25.2 | $22.0 | $69.8 | $18.6 | $445.9 | $661.4 |
| R. C. Pumps | $1,133.4 | $431.4 | $0.0 | $0.0 | $99.9 | $357.5 | $43,119.3 | $25,003.5 |
| RCS Total | $4,972.5 | $819.6 | $25.2 | $22.0 | $169.7 | $376.1 | $68,434.5 | $98,272.2 |
| CVC Valves | $3,474.4 | $3.0 | $80.0 | $12.0 | $58.0 | $13.2 | $450.8 | $441.5 |
| CVC Pumps | $3,692.7 | $0.0 | $647.6 | $284.7 | $0.0 | $72.8 | $2,198.5 | $3,417.7 |
| CVC Tanks | $40.3 | $2.4 | $0.0 | $0.0 | $0.0 | $3.1 | $4.1 | $21.4 |
| CVC Total | $7,207.3 | $5.4 | $727.6 | $296.6 | $58.0 | $89.1 | $2,653.4 | $3,880.5 |
| LHI/RHR Valves | $2,127.2 | $0.0 | $28.8 | $2.5 | $21.8 | $6.5 | $168.2 | $180.3 |
| LHI/RHR Pumps | $1,626.4 | $186.6 | $0.0 | $206.8 | $66.7 | $285.1 | $1,433.4 | $4,247.8 |
| LHI/RHR Total | $3,753.6 | $186.6 | $28.8 | $209.2 | $88.5 | $291.6 | $1,601.6 | $4,428.0 |
| HPSI Valves | $6,668.4 | $0.0 | $204.0 | $0.0 | $199.9 | $3.7 | $1,120.6 | $1,320.9 |
| HPSI Pumps | $1,021.1 | $46.1 | $222.0 | $0.0 | $87.4 | $0.0 | $850.0 | $1,920.4 |
| HPSI Tanks | $110.4 | $4.0 | $0.0 | $0.0 | $0.0 | $0.0 | $13.5 | $19.8 |
| HPSI Total | $7,799.9 | $50.1 | $426.1 | $0.0 | $287.3 | $3.7 | $1,984.0 | $3,261.2 |
| Grand Total | $23,733.3 | $1,061.8 | $1,207.6 | $527.9 | $603.5 | $760.5 | $74,673.5 | $109,842 |

Fig. 4

| Component / Issue and Action | | 1999 | 2000 | 2001 | 2002 | 2003 | 2004 | 2005 | 2006 | 2007 | 2008 | 2009 | 2010 | 2011 |
|---|---|---|---|---|---|---|---|---|---|---|---|---|---|---|
| Reactor Coolant Pumps | | | | | | | | | | | | | | |
| Obtain spare rotating elements to implement swap-out for TB and TV bolt repairs | | | | | | | | | | | | | | |
| Order new thermal barrier | | | | | | | | | | | | | | |
| Degraded thermal barrier performance – higher than expected bearing and seal temperatures – develop a strategy for thermal barrier replacement within current outage constraints | RCP A | | | | | | | | | | | | | |
| | RCP B | | | | | | | | | | | | | |
| Spare motors – verify that motors are completely interchangeable | | | | | | | | | | | | | | |
| Motor overhaul frequencies – develop an overhaul strategy considering using spares to facilitate refurbishment non-outage | | | | | | | | | | | | | | |
| Turning vane bolt IGSCC – high probability some bolts cracked, no impact on operations, replace when thermal barrier work planned | | | | | | | | | | | | | | |
| Evaluate cost-benefit of changing to cartridge seals | | | | | | | | | | | | | | |
| Iron Oxide in seal water – develop an optimal seal water filtration and flushing program to be implemented at both sites | | | | | | | | | | | | | | |
| Vibration monitoring – assess vibration signals at next outage and evaluate monitor redesign | | | | | | | | | | | | | | |

Legend:
- Assessment Indicates No Further Action Required at this Time
- Reassess the Issue
- Inspection Required
- Repair/Replacement Contingencies in
- Take Action by Analysis, Monitoring, or Operational Change

Fig. 5

FACILITY LIFE MANAGEMENT METHOD

CROSS-REFERENCE TO RELATED APPLICATION

The instant application claims priority from Provisional Application No. 60/332,844 filed Nov. 16, 2001, the disclosures of which are incorporated herein by reference.

BACKGROUND OF THE INVENTION

1. Field of the Invention

The present invention relates generally to a method of determining the selection and timing of maintenance tasks to perform on a facility as it ages and, more particularly, to a method of doing the same to a nuclear power plant.

2. Description of the Related Art

Different types of costs of varying degrees are associated with the operation of a facility such as a nuclear power plant. As such, great difficulty has been encountered in determining whether or not proactive maintenance activities are cost justified. Such difficulty has been compounded by the different sets of failure data from different sources that are associated with the various components of a nuclear power plant, and has been further compounded by the varying criticalities of the different components of the nuclear power plant.

A need thus exists for a method of selecting and planning the proactive performance of maintenance activities and other activities for a facility such as a nuclear power plant. This need includes the need to provide a basis for analyzing the economic feasibility of various activities that could be performed proactively at various times and for optimization. A need also exists for a method of combining different sets of data, such as failure data from different sources that might include industry data, fleet data, expert data, data that is specific to a given facility, data from a manufacturer, as well as data from other sources, in order to improve the accuracy of predicting the failure of various elements or components of the facility. A need also exists for enabling such activities to be planned according to a budget and to be performed in accordance with a maintenance plan.

SUMMARY OF THE INVENTION

These needs and others are met and exceeded by an improved method of selecting and planning the performance of various maintenance activities on a facility such as a nuclear power plant. One aspect of the improved method includes determining the net present value of a number of future net savings that are expected to result from performance of the maintenance activity at a given time, and selecting and planning the maintenance activities in a fashion that maximizes net present value. The method includes, for each of a number of components and a number of time periods, determining a change in the probability that a component will fail within a time period, with the change resulting from an assumption that a maintenance activity is performed. The change in probability is multiplied with the losses associated with a failure in order to determine a gross savings from which costs are subtracted to determine net savings. The probabilities of failure may be determined from a probability failure model that has been derived from multiple sets of failure data that are characterized by Weibull probability distributions and are mathematically combined according to Bayes' Theorem. The maintenance activities may also be optimized according to a number of budget figures. An apparatus for performing the method is also disclosed.

Accordingly, an aspect of the present invention is to provide an improved method of selecting and planning the activities such as maintenance activities that are performed during the lifetime of a facility such as a nuclear power plant.

Another aspect of the present invention is to determine the change, due to performance of a maintenance activity, in the probability of a component failure, and to multiply the change in probability with the losses associated with a failure to determine gross savings from which costs can be subtracted as part of a determination of the net savings that result from performance of the maintenance activity.

Another aspect of the present invention is to determine a number of net savings that result from performance of a maintenance activity based at least in part upon a number of positive and negative cash flows, with the net savings then each being discounted back to a net present value (NPV) and summed to determine a total NPV.

Another aspect of the present invention is to provide an improved method of maximizing the net present value of a facility's maintenance and/or equipment replacement programs.

Another aspect of the present invention is to provide an improved method of determining whether or not various proactive maintenance activities are cost-justified.

Another aspect of the present invention is to provide an improved method of optimizing the timing of proactive maintenance activities planned for a facility.

Another aspect of the present invention is to provide an improved method of optimizing the planning and performance of proactive maintenance activities according to a number of periodic budget figures.

Another aspect of the present invention is to provide an improved method of mathematically combining different sets of failure data in order to improve the precision with which the failure of an element of a facility such as a nuclear power plant can be predicted.

Accordingly, an aspect of the present invention is to provide an improved method of optimizing the timing of a number of maintenance activities for a facility, in which the general nature of the method can be stated as including, for each maintenance activity, calculating a number of expected net savings based upon an assumption of performance of the maintenance activity at a given time, performing said calculating step for each of a number of assumed given times of performance of the maintenance activity, and for each of at least some of the maintenance activities, determining the given time at which the corresponding expected net savings result in a substantially maximum net present value.

The aforementioned planning the performance of the maintenance activity at the given time may include planning to make a monetary expenditure at the given time for the maintenance activity, and the method may further include determining, for each of a number of given times, a sum of the monetary expenditures planned to be made at the given time based upon the maintenance activities planned to be performed at the given time. A budget amount may be associated with each given time and, as to at least some of the maintenance activities, the aforementioned planning the performance of the maintenance activity at the given time in which the corresponding expected net savings result in a substantially maximum net present value may include planning the performance of the maintenance activity at the given time in which (a) the corresponding expected net savings result in a substantially maximum net present value, and (b) the sum of the related monetary expenditures planned to be made at the given time is no greater than the budget amount associated with the given time.

The facility may include a number of elements, with the maintenance activities relating to the elements, and with the aforementioned calculating a number of expected net savings based upon an assumption of performance of the maintenance activity at a given time may include determining a number of failure probabilities of the related element based upon the assumption of performance of the maintenance activity at the given time. The aforementioned determining a number of failure probabilities may include mathematically combining a first set of failure data with a second set of failure data, and may include employing Bayes' Theorem to combine the first and second sets of failure data. The first and second sets of failure data each include at least one of (i) data relating to a population which includes at least a portion of the facility, (ii) data relating to an industry which includes the facility, (iii) data relating specifically to the facility, (iv) data from an expert, (v) data from a manufacturer, and (vi) another set of failure data resulting from mathematically combining of a pair of sets of failure data, as well as other data.

The method may also include displaying on a chart the planned maintenance activities and the times for performance thereof. The facility may include a number of elements, with the maintenance activities relating to the elements, and with the aforementioned displaying on a chart potentially including listing on the chart the element, the nature of the maintenance activity to be performed with respect to the element, and the time for performance of the maintenance activity. The aforementioned displaying on a chart may include displaying the information in a graphical form.

Another aspect of the present invention is to provide an improved method of determining whether or not to plan the performance a maintenance activity on a facility, in which the general nature of the method can be stated as including calculating a number of expected net savings based upon an assumption of performance of the maintenance activity at a given time, performing said calculating step for each of each of a number of assumed given times of performance of the maintenance activity, and, for each given time, calculating a net present value of the expected net savings. The method also includes identifying the maximum amount among the net present values and determining whether the maximum amount is a positive amount or a negative amount.

The aforementioned planning the performance of the maintenance activity may include planning the performance of the maintenance activity only if the maximum amount is a positive amount, and also may include planning the performance of the maintenance activity at the given time corresponding with the maximum amount.

Another aspect of the present invention is to provide an improved method of maintaining a facility, with the facility including a number of elements, in which the general nature of the method can be stated as including selecting a number of the elements according to a number of criteria, identifying a number of failure mechanisms for the selected elements, and developing a number of the maintenance activities to correspond with the failure mechanisms. For each maintenance activity, the method includes calculating a number of expected net savings based upon an assumption of performance of the maintenance activity at a given time, performing the aforementioned calculating step for each of each of a number of assumed given times of performance of the maintenance activity. For each of at least some of the maintenance activities, the method includes determining the given time in which the corresponding expected net savings result in a substantially maximum net present value.

Another aspect of the present invention is to provide an improved method of calculating, for an element of a facility, a probability of failure of the element within a given time period, the given time period being defined as extending between a first time and a second time, in which the general nature of the method can be stated as including characterizing a first set of failure data with a first Weibull distribution, characterizing a second set of failure data with a second Weibull distribution, and mathematically combining the first set of failure data with the second set of failure data to form a posterior set of failure data. The method further includes determining a first probability of failure of the element at or before the first time according to the posterior set of failure data, determining a second probability of failure of the element at or before the second time according to the posterior set of failure data, and calculating the difference between the first and second probabilities of failure.

Another aspect of the present invention is to provide an apparatus for optimizing the timing of a number of maintenance activities for a facility, in which the general nature of the apparatus can be stated as including means for calculating a number of expected net savings based upon an assumption of performance of the maintenance activity at a given time, means for performing said calculating step for each of a number of assumed given times of performance of the maintenance activity, and means for determining the given time at which the corresponding expected net savings result in a substantially maximum net present value.

BRIEF DESCRIPTION OF THE DRAWINGS

A further understanding of the invention can be gained from the following Description of the Preferred Embodiment when read in conjunction with the accompanying drawings in which.

DESCRIPTION OF THE PREFERRED EMBODIMENT

The present invention is directed generally toward determining which, if any, proactive maintenance activities should be performed on a facility such as a nuclear reactor, and also what should be the timing of such maintenance activities. According to the present invention, the decision as to whether or not to perform a given maintenance activity, as well as the timing of such performance, is based primarily on the calculated Net Present Value (NPV) of a number of future savings that are expected to result from performance of the maintenance activity at a given time. Specifically, it is known that money generally increases in value as a function of time.

Correspondingly, a future amount of money must be discounted, i.e., decreased in value, by a discount rate in order to determine the value of the future amount in present day dollars, i.e., the NPV. A future amount is discounted to a present day amount by dividing the future amount FV by $(1+R)^n$ where R is the discount rate and n is the number of periods in the future the future amount is valued.

As will be set forth more fully below, the method of the present invention allows for optimization of the selection and timing of proactive maintenance activities by selecting the maintenance activities at the given times that will result in substantially the maximum NPV across a facility. Since a monetary expenditure is often required in performing a maintenance activity, the selection and timing of maintenance activities can also be optimized such that the total monetary expenditures that will be required at different times fall within budget limitations at the different times. The method of the present invention additionally provides a method of mathematically combining different sets of failure data from different sources in order to improve the accuracy of failure estimates that are employed in determining expected savings and resulting NPVs.

As used herein, the expression "facility" and variations thereof is to be construed broadly and refers to any type of structure or system that requires maintenance activities to be performed thereon, and can refer to any type of fixed or movable structure or system such as, for instance, nuclear power plants, buildings, machinery, and other diverse structures and systems, as well as elements or components of the same. The exemplary facility is described herein in the context of the methods of the present invention as being a nuclear power plant, but the facility is described as such merely for purposes of illustration and not in a limiting fashion. While the facility likely will have a conditional probability of failure that increases with age, and the consequences of failure will exceed the cost of preventing the failure, either or both circumstances potentially could be lacking from the facility without departing from the concept of the present invention. As used herein, the expression "maintenance activity" and variations thereof is to be construed broadly and refers to any type of task or undertaking, either an affirmative action or an inaction, that can or should be performed as to a facility, and can include activities such as inspections, repairs, replacements, cleanings, alignments, calibrations, and the like without limitation. As used herein, the expression "a number of" and variations thereof can refer to both a singular quantity and a plural quantity without limitation. As used herein, the expression "failure" and variations thereof is to be broadly construed and can include any type of lost or reduced function or a defined condition or characteristic that may, for instance, be determined by inspection or by other indicia, and that may be the subject of a failure definition or may be recognized as a failure. Accordingly, a failure is not limited to a catastrophic failure and rather may be defined by other indicia without limitation.

It is known that a cumulative probability function can be characterized by determining values at the $5^{th}$ percentile, the $50^{th}$ percentile, and at the $95^{th}$ percentile of the function. For instance, if one thousand parts are tested to failure, the time at which 5% of the parts had failed would be the $5^{th}$ percentile value, the time at which 50% of the parts had failed would be the $50^{th}$ percentile value, and the time at which 95% of the parts had failed would be the $95^{th}$ percentile number. In instances where it is not possible to test large numbers of parts, the values can be estimated from expert opinion using the known methods of probability elicitation developed by decision analysis by first estimating the $50^{th}$ percentile value, which is a 50% value or a mean value, and by then estimating a 90% confidence band about the mean which would identify values at 45% on each side of the mean, i.e., at 5% and at 95%. The cumulative probability function can be derived from these three-point values using the known Extended Pearson-Tukey Approximation.

It is known, however, that failure data can come from numerous sources. Examples of such sources might include industry data, fleet data, expert data, data that is specific to a given facility, data from a manufacturer, as well as data from other sources. Each source often provides data in the form of a set of failure data, and these sets of failure data often are characterized by separate cumulative probability functions such as would result from application of the aforementioned Extended Pearson-Tukey Approximation. All of the available sets of failure data preferably would be combined in order to improve the accuracy of predicting the failure of various elements or components of the facility. However, the cumulative probability functions derived from the Extended Pearson-Tukey Approximation are nonlinear and cannot readily be mathematically combined.

It is also known that a Weibull distribution can be employed to characterize the probability of failure of a system in which the rate of failure increases with age according to the following formula:

$$F(x)=1-\exp(-(x/\alpha)^\beta \text{ where} \quad \text{(Equation 1)}$$

x=age, such as in years of actual operation;
α=a scale parameter that must be estimated; and
β=a shape parameter that must be estimated.

The result of the equation is a probability of failure at or before the age x. This equation can be converted into a linear form by the following known transformation:

$$\ln(-\ln(1-F(x))=-\beta\ln(\alpha)+\beta\ln(x). \quad \text{(Equation 2)}$$

By letting the term on the left of the equation equal Y, letting the first term on the right of the equation equal A, and letting ln(x) equal X, a linear regression model is obtained:

$$Y=A+\beta X+u \quad \text{(Equation 3)}$$

where u is a regression error term based upon an assumption that the data are normally distributed with mean zero and standard error σ. It is noted that the α and β values each have their own associated standard error σ values.

When Equation 3 is applied to failure data, the failure estimate model can be defined by the following equation:

$$Y=A+BX. \quad \text{(Equation 4)}$$

Advantageously, if least squares regression analysis is applied to paired observations of Y and X to estimate sample values for A and B, then it can be assumed that the sampling distribution for the shape estimate of Equation 4, i.e., the B value, is normally distributed with mean equal to the estimate itself, i.e., unbiased, with variance given by the square of the standard error, i.e., the $\sigma_B$ value associated with the shape estimate. Thus:

$$B \sim \text{normal}(B,\sigma_B^2). \quad \text{(Equation 5)}$$

The same can be said for the constant (scale) regression term of Equation 4, thus:

$$A \sim \text{normal}(A,\sigma A^2). \quad \text{(Equation 6)}$$

This result is particularly advantageous when considered in the context of multiple sets of failure data from different sources, since it can be shown that any normal first set of data can be combined with any normal second set of data via Bayes' Theorem to produce a posterior set of failure data which also has a distribution that is normal with a mean equal to a weighted average of the means of the first and second sets of failure data. Specifically, the means of the first and second sets of failure data are weighted according to their relative precision as measured by each mean's variance. A Bayesian interpretation of data in such a fashion sees the regression parameter, i.e., the B value, as a random variable that is normally distributed.

For instance, if a first set of failure data is characterized by $(B_1, \sigma_1)$ and a second set of failure data is characterized by $(B_2, \sigma_2)$, a Bayesian interpretation of the combined first and second sets of failure data is as follows:

$$B_P = (\sigma_1^2/(\sigma_1^2+\sigma_2^2))B_2 + (\sigma_2^2/(\sigma_1^2+\sigma_2^2))B_1 \quad \text{(Equation 7)}$$

where $B_P$ is the posterior regression factor from the Bayesian combination of the first and second sets of failure data. A similar result can be obtained for the constant (scale) regression term of Equation 4 by employing the A values and the corresponding $\sigma_A$ values for the first and second sets of error data.

By inputting the $5^{th}$ percentile, the $50^{th}$ percentile, and at the $95^{th}$ percentile values of a first set of failure data into a computer on which is running known regression software employing the aforementioned linearized functions, i.e., Equations 2-4, the software outputs a value for a along with an associated standard error $\sigma$, as well as a value of $\beta$ along with an associated standard error $\sigma$. Commonly known and used spreadsheet software packages include all of the functions required to run the aforementioned analyses. The first set of failure data is characterized by a Weibull distribution employing the output $\alpha$ and $\beta$ values. By doing the same for a second set of failure data, i.e., inputting the $5^{th}$, $50^{th}$, and $95^{th}$ percentile values of the second set of failure data into the computer, an $\alpha$ value, a $\beta$ value, and a pair of corresponding $\sigma$ values are obtained. A second Weibull distribution employing these second $\alpha$ and $\beta$ values characterizes the second set of failure data. The $\alpha$, $\beta$, and $\sigma$ values for the first and second sets of failure data can then be mathematically combined according to the Bayesian interpretation set forth above in Equation 7 to produce a posterior set of failure data characterized by a posterior Weibull distribution.

Figure 1:
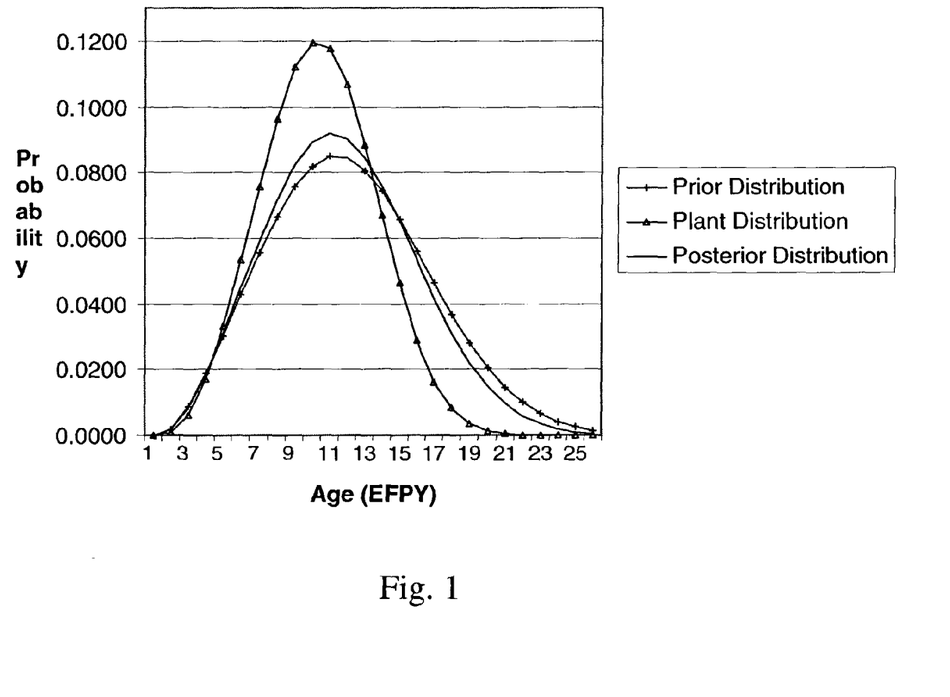
FIG. 1 is an exemplary probability density chart depicting a pair of input probability density curves and a posterior probability density curve.

For purposes of graphical illustration, an example of a posterior set of failure data resulting from the Bayesian combination of a first set of failure data and a second set of failure data is depicted generally in FIG. 1. It is noted that the exemplary curves depicted therein are probability density curves, not cumulative probability curves. The curves of FIG. 1 thus would indicate the probability of failure "at" a given time, not "at or before" a given time. Cumulative probability curves could, however, be derived from FIG. 1, and it is noted that the Weibull distribution of Equation 1 is a cumulative probability function.

An example of the need for combining different sets of failure data is as follows. Engineers at a facility such as a given nuclear power plant may be aware of a set of fleet data for a component of the nuclear reactor employed in the plant. In this regard, the manufacturer of the component may have developed a set of failure data representative of the entire fleet of such components of a given model or type it has manufactured, which would include the component of the nuclear reactor at the given nuclear power plant. The same engineers may also be aware of a second set of failure data that is specific to the particular component of the nuclear reactor at the facility, and that this second set of failure data is different than the set of fleet data.

The set of fleet data, i.e., the first set of failure data, can advantageously be mathematically combined with the set of data particular to the component of the nuclear reactor, i.e., the second set of failure data, using the aforementioned Bayesian procedure. Such a procedure produces a posterior set of failure data characterized by a Weibull distribution (Equation 1) employing values of $\alpha$ and $\beta$ that have been mathematically weighted according to the relative uncertainties of the first and second sets of failure data.

The posterior set of failure data can be further combined with additional sets of failure data in the same fashion. For instance, the engineers may also be aware of a set of failure data derived by an expert. The set of failure data from the expert can be combined with the aforementioned posterior set of failure data according to the Bayesian methodology to result in a new posterior set of failure data.

As such, the method of the present invention advantageously permits multiple sets of failure data to be mathematically combined in order to permit engineers to predict failure with greater accuracy. Specifically, the method of the present invention permits multiple sets of failure data to each be characterized by a separate Weibull distribution, and for the Weibull distributions to be mathematically combined into a posterior Weibull distribution with the use of Bayes' Theorem. The posterior Weibull distribution can be used to predict a cumulative probability of failure at any time, and thus is not limited by the $5^{th}$, $50^{th}$, and $95^{th}$ percentile values from which the Weibull distribution may have been derived.

The posterior Weibull distribution is then employed to calculate probabilities of failure in order to estimate future net savings in a fashion to be described below. Such net savings are expected to result from performance of a given maintenance activity at a given time and are discounted into a Net Present Value (NPV) to determine whether or not to perform the given maintenance activity. It is noted, however, that the NPV calculations described herein can be performed using any Weibull distribution, even one which did not result from the mathematical combination of a plurality of sets of failure data. For instance, if the only failure data available is a set of fleet data, the regression software mentioned above can convert the fleet data into a Weibull distribution which can be employed in calculating the expected net savings. If additional failure data are available, however, all of the data can be combined with the aforementioned Bayesian interpretation to produce a posterior set of failure data which is presumed to be more accurate at predicting failure than any of the individual sets of failure data, and such posterior set of failure data can be employed to more accurately predict future net savings.

It is noted that a number of maintenance activities often must be performed on a facility in order to maintain the proper operation of the facility. In many circumstances it may be desirable to perform maintenance activities in a proactive fashion, meaning that activities such as repair and replacement of an element are performed in advance of a failure of an element. At present, may of the maintenance activities performed on a nuclear reactor are performed after a defined failure event, meaning that the element associated with the maintenance activity is often run until failure.

Proactive maintenance is particularly desirable in situations in which the cost of proactively performing a maintenance activity is less than the cost associated with performing the maintenance activity after a failure or otherwise responding to, the failure. For instance, the costs associated with regulatory oversight are extremely high in the nuclear industry, and are particularly high in the event of a component failure. Significant savings thus potentially can be achieved by performing maintenance activities in a proactive fashion in order to avoid a failure so long as the maintenance activities are properly planned such that the costs thereof does not exceed the costs associated with a failure.

In order to properly plan proactive maintenance activities in accordance with the present invention, a number of future net savings that are expected to result from performance of a given maintenance activity at a given time are calculated. These net savings are representative of the amount by which the benefit provided by a maintenance activity exceeds the cost of the maintenance activity. The benefit provided by a maintenance activity is determined by first calculating the amount by which the probability of a failure is changed, i.e., reduced, because the maintenance activity is performed, and then by multiplying the change in probability of failure with the losses associated with a failure. This calculation determines gross savings, which is the value provided by the maintenance activity in terms of the resultant reduced likelihood of a failure multiplied with the losses due to a failure.

The costs associated with the maintenance activity are subtracted from the gross savings as part of the calculation to determine net savings. Such expected net savings are then discounted into an NPV associated with the specific maintenance activity being performed at the specific time. This same procedure is performed for the same maintenance activity for each of a variety of given times to determine NPVs for performance of the maintenance activity at the different times. The maintenance activity is then planned to be performed at the given time associated with the highest positive NPV. As a general matter, if the calculations result only in negative or zero value NPVs, the maintenance activity is not planned to be performed since a negative NPV indicates that the cost of the proactive maintenance activity exceeds the cost of a failure and is thus not financially justified.

The starting point in the process is to select the elements of the facility having the most substantial impact on defined plant goals such as safety, regulatory compliance, importance to power production, importance to maintenance, risk significance, component failure cost significance, defined performance indicators, and other criteria. The importance of each element to each of the criteria is determinative of an overall importance for the element. One or more of the criteria may be weighted depending upon their relative importance, such as if safety were considered to be relatively more important than component failure cost.

Often the selection process begins with a relatively broader system-level analysis and finishes at a relatively narrower sub-component analysis. For instance, a system such as a cooling system may initially be identified and analyzed. Within the cooling system, a pump and other components may be individually identified and analyzed. Eventually, the various sub-components of the pump such as the pump seals will be identified and analyzed. In this fashion, the engineers are able to identify, for instance, which of the components are most important to a system and to the facility.

Beginning with those elements having the greatest importance according to the defined criteria, each element is analyzed to determine all of the various aging mechanisms thereof. Once the aging mechanisms are identified, one or more maintenance activities are identified that would be responsive to the various aging mechanisms.

All of the proposed maintenance activities for all of the elements are then analyzed to determine expected net savings, NPVs, and maintenance recommendations. Specifically, each maintenance activity is analyzed based upon an assumption that the maintenance activity would be performed at a given time, and the resulting expected net savings and corresponding NPV are determined. The same process is then repeated for the maintenance activity assumed to be performed at different times, and NPVs are determined for each of the different times. The proactive maintenance activity is planned for the time that results in the substantially maximum positive NPV. The process is repeated for each maintenance activity in order to optimize the selection and timing of maintenance activities based upon substantially maximizing NPV across the facility.

Figure 2:
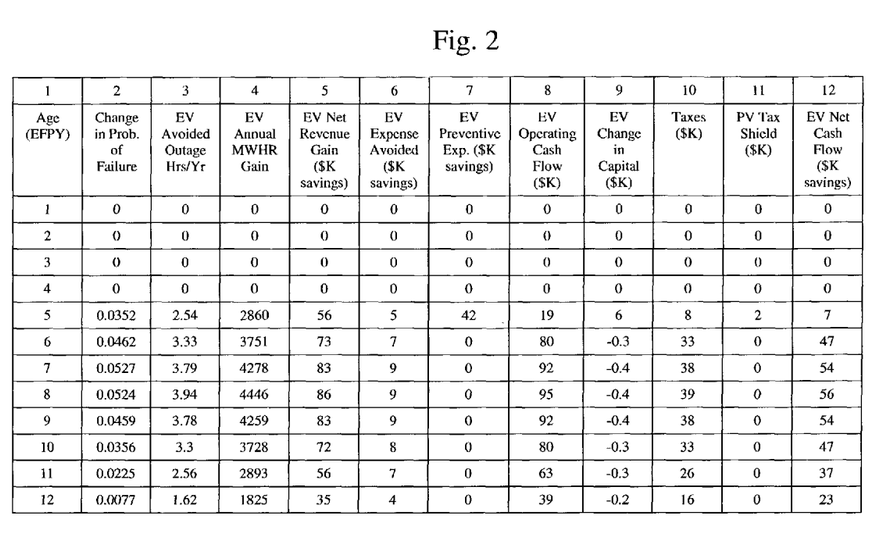
FIG. 2 is an exemplary chart showing some of the calculations for determining the expected net savings that will result from performance of a maintenance activity at a given time, specifically when the facility is five years of age.

An example of a portion of a net savings analysis for one component is depicted generally in FIG. 2. The expression "$K" as employed herein, including in the drawings, refers to thousands of dollars. The exemplary maintenance activity is the replacement of a pump seal of a nuclear power plant, and the exemplary timing of the maintenance activity is when the reactor is five years of age. The chart of FIG. 2 includes twelve rows, with each row corresponding with a year of age of the reactor and including the figures for determining an expected value (EV) of the net savings (column 12) at each year based upon an assumption that the pump seal is replaced at year five. It is understood that nuclear reactors typically have a life span on the order of forty or more years, although only twelve of those years are depicted in FIG. 2. Accordingly, the determination of net savings would, in practice, not end at twelve years, but rather would continue through the planned life of the reactor. It is noted that licenses for nuclear power plants potentially can be extended for an additional twenty years, and thus the life of a nuclear power plant potentially could be considered to include this extension period. For purposes of illustration, only the first twelve years of the net savings analysis are shown in FIG. 2.

It is repeated herein that the expected value of the net savings for each year reflects the difference between the benefit provided by the maintenance activity in terms of a reduced likelihood of failure in a given year and the cost of the maintenance activity in the same year. In the example of FIG. 2, the maintenance activity is performed in year five, meaning that nothing is done as to the element in any of years one through four. Since the status quo is maintained in each of years one through four, the expected value of the net savings for each of years one through four is zero. This is because the odds of a failure in years one through four do not change as a result of a maintenance activity performed in year five.

In year five, however, the maintenance activity is performed. Column 7, row five, indicates that the expected value of the preventative expense, i.e., the cost of the replacing the pump seal in terms of parts, labor, lost production, and every other expense associated with the maintenance activity is $42,000. It is noted that in the context of a nuclear power plant, lost production refers generally to the quantity of electrical power that could have been produced but was not produced during performance of the maintenance activity, such as if the reactor were shut down or the power level reduced. The $42,000 expense is subtracted from the gross savings that are expected to result due to a reduced probability of a failure in year 5 as a result of performing the maintenance activity.

In order to calculate the expected gross savings for each year, one must first determine the change in the probability of a failure occurring in each year. The change in probability is then multiplied with known costs associated with a failure. The aforementioned change in probability is the difference between the probability of a failure occurring if it is assumed that the maintenance activity were not performed minus the probability of a failure occurring if it is assumed that the maintenance activity is performed. As indicated above, since the maintenance activity was performed in year five, and thus the status quo was maintained in years one through four, the performance of the maintenance activity in year five has no effect on the probability of a failure in years one through four, hence no net savings exists for years one through four.

The reason that the net savings analysis is based upon a change in probability of failure instead of, say, an absolute probability of failure, is that the net savings analysis is intended to reflect the change, i.e., the reduction, in the costs associated with failure due to the maintenance activity having been performed. In the foregoing example of FIG. 2, it is implicitly assumed that the maintenance activity results in replacement of the pump seal with exactly the same kind of pump seal. The model in question and the method of the present invention can also allow for a maintenance activity, such as the replacement of an old part with a new part that has a different average life, simply by changing a multiplier, such as by assigning a value of 1.5 to indicate that the average life of the replacement part is expected to be 50% higher than that of the old counterpart.

The probability of failure at year five is the result of plugging the number 5 as the value x in the Weibull function (Equation 1) that characterizes the failure probability of the pump seal. The probability at year one is the result of plugging the number 1 as the value x into the same equation. The difference between the two calculated probabilities is the change in probability, and the exemplary change in probability of failure in year five (Column 2) is indicated as being 0.0352, i.e., 3.52%.

The expected value of the expense avoided, i.e., savings, which is a positive cash flow, is the change (i.e., reduction) in probability of failure multiplied by the costs associated with a failure. The nature and amount of the costs associated with a failure can vary greatly depending upon the nature of the facility. Since the exemplary facility described herein is a nuclear power plant, the costs associated with a failure would include lost revenues due to a loss of power production and expenses due to regulatory compliance. Accordingly, the corresponding savings that result from avoidance of a failure are a net revenue gain and an expense avoided, respectively.

The expected value of the avoided outage in hours per year (Column 3) is the product of the change in probability of failure (Column 2) multiplied with the average number of hours per failure of this type from the Generation Availability Database System (GADS) supplied by the North American Electric Reliability Council. The exemplary product for year five is 2.54 hours per year.

The expected value for the annual MWHR (megawatt-hour) gain (Column 4) is the product of the expected value of the avoided outage in hours per year (Column 3) multiplied with the facility's gross rated capacity multiplied with its projected capacity factor. The MWHR gain is the gain in electrical power in megawatt-hours that are expected to be produced as a result of performance of the maintenance activity. The exemplary value for year five is 2860 MWHR.

The expected value of the net revenue gain (Column 5) is the product of expected value for the annual MWHR gain (Column 4) multiplied with the projected net revenue per megawatt hour (gross revenue per megawatt hour minus fuel costs per megawatt hour). The estimated value is $56,000.

The estimated value of the expense avoided (Column 6) is the product of the change in probability of failure (Column 2) multiplied with the non-capitalized expense resulting from an unplanned failure, which can include fines, inspection costs, and other expenses due to regulatory compliance. The exemplary expected value of the expense avoided is $5000.

The expected value of the operating cash flow (Column 8) thus is the sum of the savings (Column 5 plus Column 6) minus the cash flow associated with the expense of the maintenance activity (Column 7). The exemplary total is $56,000+$5000−$42,000=$19,000.

Columns nine through eleven include values that are accounting-based, but still must be included in the calculation. The expected value of the change in capital (Column 9) reflects the capital improvement resulting from the replaced pump seal, which is a cash flow out and thus must be subtracted from Column 8. The taxes paid (Column 10) is an additional expense that must be subtracted from Column 8. The present value of the tax shield, which is in the nature of depreciation, is a positive value that is added to Column 8. The exemplary values of Columns nine through eleven are $6000, $8000, and $2000, respectively. The estimated value of the net savings (Column 12) thus is the total of Column 8 minus Column 9 minus Column 10 plus Column 11, i.e., $19,000−$6000−$8000+$2000=$7000.

The expected value of the net savings (Column 12) is then calculated for the years remaining through the end of the life of the reactor, of which only years six through twelve are depicted in FIG. 2. For example, the change in probability of failure (Column 2) for year six would be the probability of a failure in year six from the Weibull function (Equation 1) minus the probability of a failure in year two from the same Weibull function. The expected value of the net savings (Column 12) for year six is $47,000.

Figure 3:
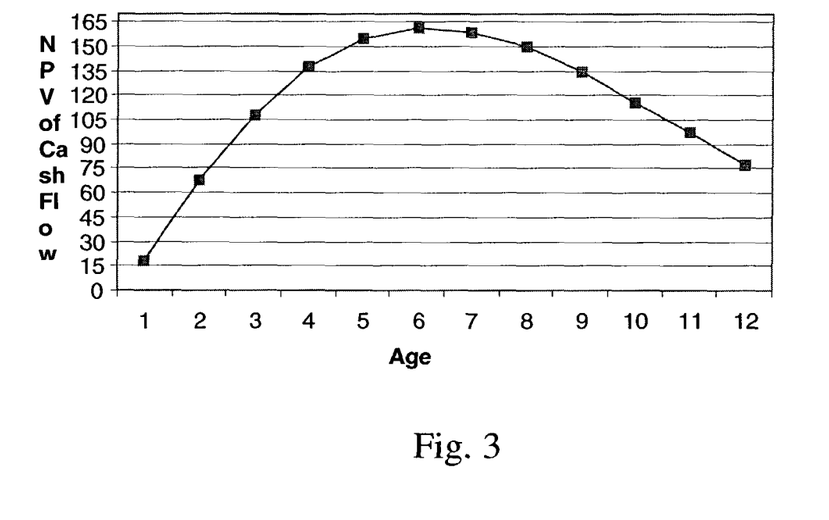
FIG. 3 is an exemplary graph of net present value figures of the expected savings resulting from the maintenance activity being performed at a range of different times.

All of the values in Column 12 (for the entire life cycle of the facility) are then discounted in a known fashion back to present value using the facility's costs of capital. The present values are then summed to determine the NPV associated with replacement of the pump seal in year five. The same procedure as discussed above and reflected, in part, in FIG. 2 is then repeated for assumptions of the pump seal being alternatively replaced in other years. These additional calculations result in NPV values associated with the other years. The NPV values associated with the various years can then be plotted on a graph such as is depicted generally in FIG. 3 in order to determine the maximum NPV of replacing the pump seal. FIG. 3 generally indicates that the maximum NPV would occur if the pump seal were replaced in year six. Since the NPV at year six is a positive value, the maintenance activity, i.e., replacement of the pump seal, is planned for performance in year 6. Again, a negative NPV would indicate that the cost of the maintenance activity exceeds the cost associated with a failure, and that such a proactive maintenance activity would not be cost justified.

It is noted that NPVs of years five through seven in FIG. 3 are not significantly different from one another. As such, the maintenance activity likely could be replaced in any of years five through seven while substantially achieving the NPV of the maintenance activity. The identification of such a range of times within which the maintenance activity can be performed can assist with the budgeting of expenses (such as the $42,000 cost of replacing the seal) and can facilitate the coordination of similar or related maintenance activities, or planning to coordinate performance of the maintenance activity with planned outages.

It is also noted that a maintenance activity may define a maintenance cycle, such as if the pump seal were to be replaced every five years, instead of the example shown in FIG. 2 in which the pump seal is replaced once at year five and not thereafter. The expected net savings would be different in that they would reflect the cost of replacement every five years as well as different changes in probability of failure from year ten onward, but the net savings would still be discounted to present day values to achieve a net present value for the maintenance cycle over the life of the facility.

With more particular reference to expenses and budgeting, it is noted that many of the maintenance activities will have an expense associated therewith, such as the $42,000 cost of replacing the pump seal in the example of FIG. 2. Once all of the maintenance activities for the facility have been optimized, i.e., those maintenance activities which result in a positive NPV have been planned at the time associated with substantially the maximum NPV, the associated expenses for the various years can be totaled to determine the funds that will be required to be expended in order to maximize NPV. An example of such totaling is provided generally in FIG. 4. While the expense associated with a maintenance activity typically will be incurred in the year in which the maintenance activity is performed, expenses additionally or alternatively can occur in other years.

Figure 4:
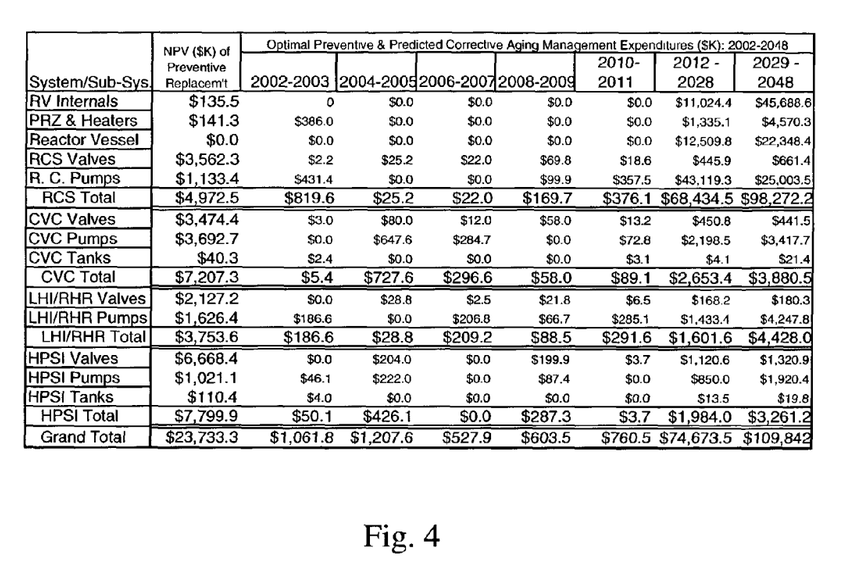
FIG. 4 is an exemplary report showing optimized net present values associated with different maintenance activities, and further showing the corresponding expenditures that will be required at different times.

It can be seen from FIG. 4 that the expenses for the various years are totaled, and that the totals vary widely. Such wide variation in expenses can be undesirable for budgetary reasons. Moreover, such totals may be far in excess of budgeted amounts. As such, another aspect of the present invention is to optimize the NPV of the maintenance activities across the facility in the event that the associated expenses must fall within periodic budget amounts. It is anticipated that much of the mathematical manipulation described above will be performed with an appropriately configured computer. In providing an absolute optimization such as described in detail above, the computer would select maintenance activities for performance at their individual maximum NPVs. However, if the expenditures must fall within established periodic budget amounts, the computer would select the set of maintenance activities having expenses that fall within the budgeted amounts and that maximize the total NPV across the facility. The results of such an output thus would be a plan for the proactive performance of maintenance activities having a substantially maximum NPV across the facility given that the expenses associated with the maintenance activities would fall within budgeted amounts.

In reaching such a result, the method of the present invention might consider the Profitability Index of each maintenance activity. The Profitability Index is defined as the NPV of the benefit of a maintenance activity divided by the NPV of the expense of the maintenance activity. For instance, the NPV of the benefit of a first maintenance activity, as calculated above by discounting the net savings from Column 12 into present day values, may be $10,000,000. The cost of the first maintenance activity discounted to present day values may be $5,000,000. The Profitability Index for the first maintenance activity would be $10,000,000/$5,000,000=2. If, however, a second maintenance activity provides a benefit having an NPV of $12,000,000 and a cost having an NPV of $4,000,000, the Profitability Index of the second maintenance activity would be $12,000,000/$4,000,000=3. The method of the present invention thus might consider the fact that the second maintenance activity has a greater Profitability Index than the first maintenance activity in reaching a determination that the second maintenance activity should be performed instead of the first maintenance activity.

Figure 6:
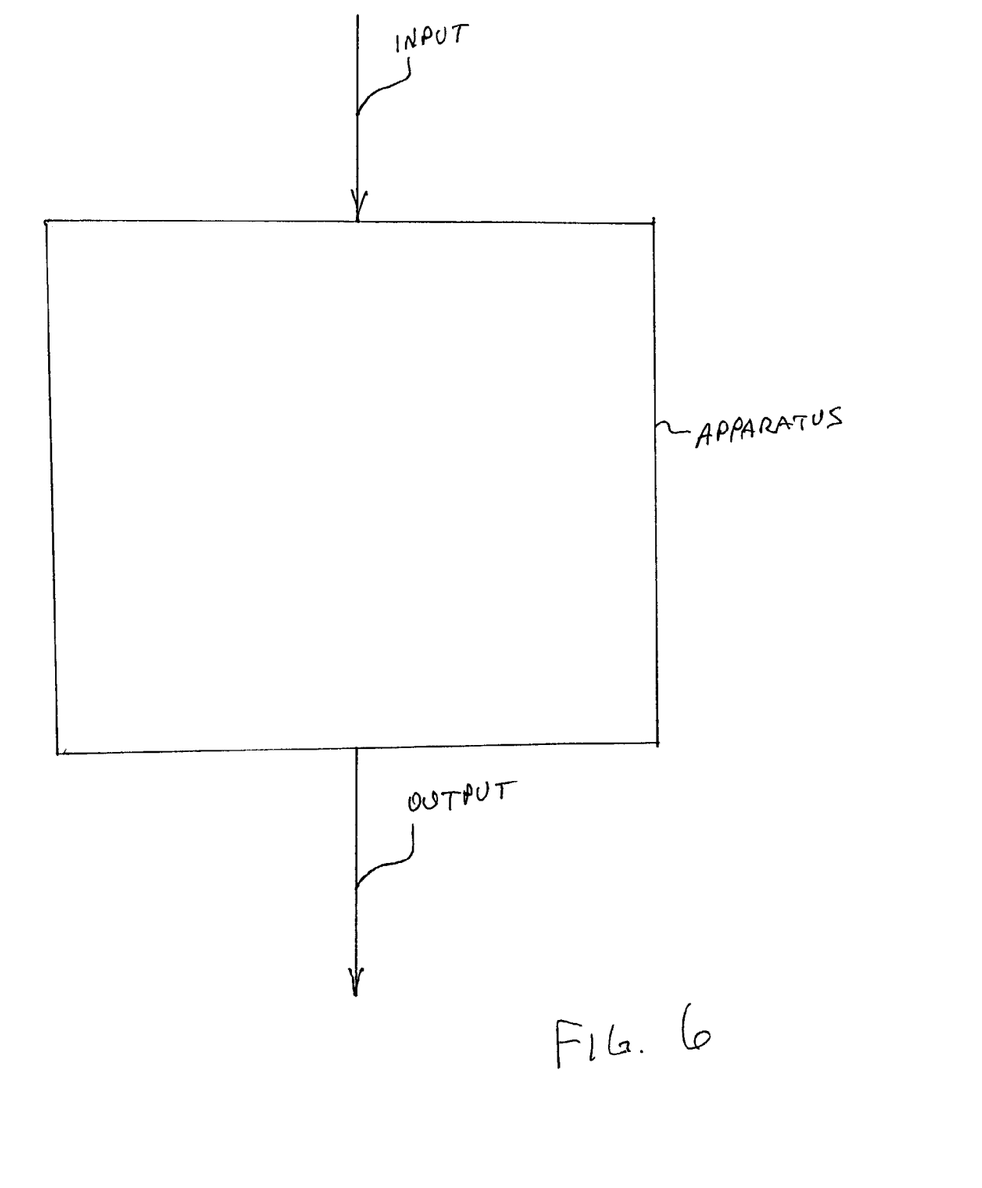
FIG. 6 is an exemplary schematic view of an apparatus for performing the method of the present invention.

It is noted that an apparatus, such as is depicted schematically in FIG. 6, which could include the aforementioned computer, may include means for calculating a number of expected net savings based upon an assumption of performance of a maintenance activity at a given time, means for performing said calculating step for each of a number of assumed given times of performance of the maintenance activity, and means for determining the given time at which the corresponding expected net savings result in a substantially maximum net present value. Such mean may variously include hardware and software that are structured and arranged for use according to the method of the present invention.

Figure 5:
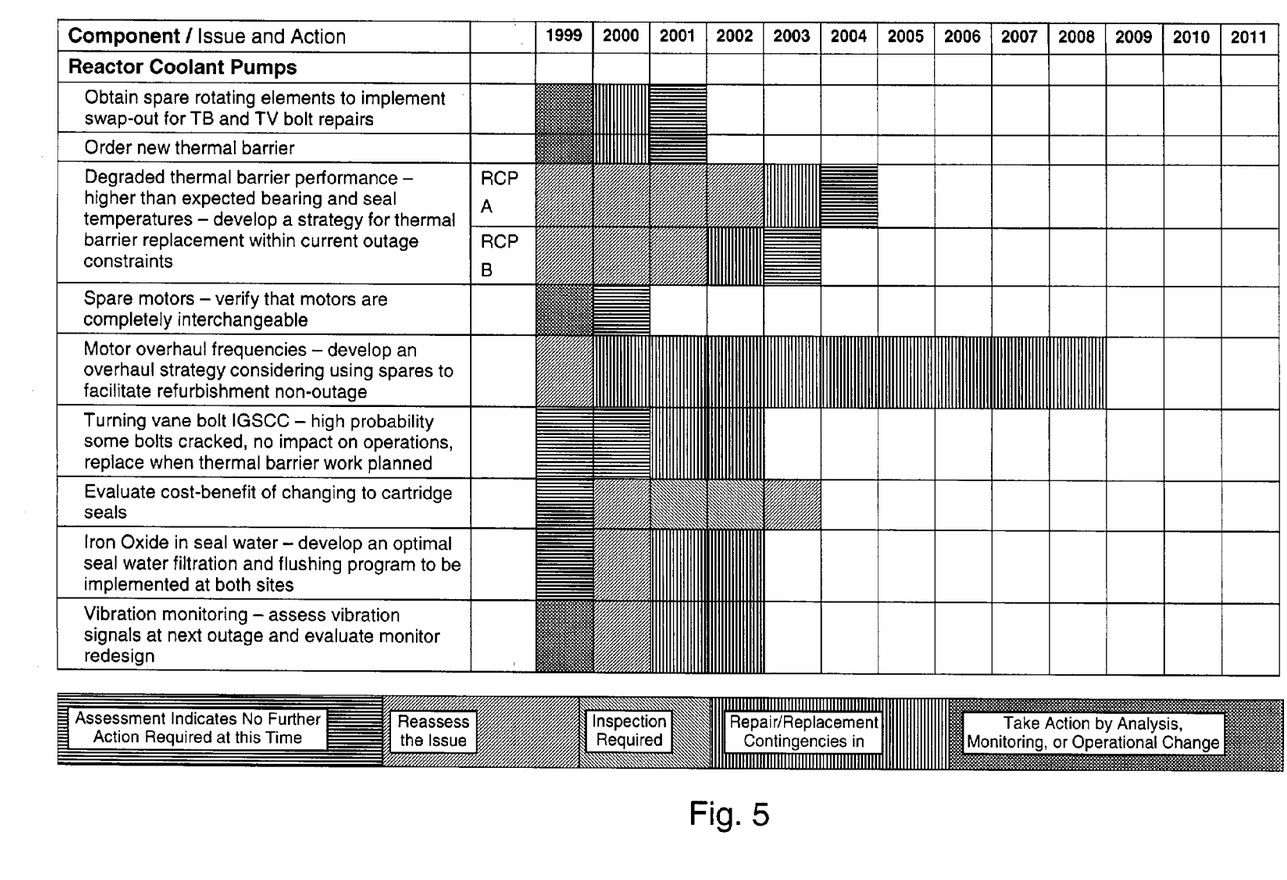
FIG. 5 is an exemplary graph depicting the timing of different maintenance activities for a number of elements of the facility.

The planned maintenance activities can be displayed graphically as a function of time such as in FIG. 5. Other display methods are possible, or the maintenance activities may alternatively be in the form of a written schedule.

It can be seen from FIG. 5 that for each element of the facility, the various maintenance activities to be performed on the element are presented as a function of time. The various maintenance activities are depicted as different hatching patterns, although the presentation could additionally or alternatively be in the form of different colors or other formats.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of employing a computer in optimizing the timing of a number of maintenance activities that relate to a number of elements of a facility, the method comprising:
   for each maintenance activity, employing the computer in:
      determining a number of failure probabilities of an element based upon an assumption of performance of the maintenance activity at a given time,
      employing at least some of the number of failure probabilities in determining a number of changes in probability of failure of the element based upon the assumption of performance of the maintenance activity at the given time, and
      employing at least some of the number of changes in probability of failure in calculating a number of expected net savings based upon the assumption of performance of the maintenance activity at the given time;
   employing the computer in performing said determining, employing, and calculating for each of a number of assumed given times of performance of the maintenance activity;
   for each of at least some of the maintenance activities, employing the computer in determining the given time at which the corresponding expected net savings result in a substantially maximum net present value; and
   outputting from the computer a plan for the proactive performance of a number of the maintenance activities that is based at least in part upon said determining the given time.

2. The method as set forth in claim 1, in which, as to at least some of the maintenance activities, said determining the given time at which the corresponding expected net savings result in a substantially maximum net present value includes employing the computer in determining a monetary expenditure at the given time for the maintenance activity, and further including employing the computer in determining, for each of a number of given times, a sum of the monetary expenditures planned to be made at the given time based upon the maintenance activities identified for the given time.

3. The method as set forth in claim 2, in which a budget amount is associated with each given time, and in which, as to at least some of the maintenance activities, said determining the given time at which the corresponding expected net savings result in a substantially maximum net present value includes employing the computer in identifying the maintenance activities at the given time in which:
   the corresponding expected net savings result in a substantially maximum net present value; and the sum of the related monetary expenditures corresponding with the given time is no greater than the budget amount associated with the given time.

4. The method as set forth in claim 3, in which said identifying the maintenance activities includes, as to at least some of the maintenance activities, employing the computer in considering a profitability index associated with the maintenance activity.

5. The method as set forth in claim 1, in which said determining a number of failure probabilities includes employing the computer in mathematically combining a first set of failure data with a second set of failure data.

6. The method as set forth in claim 5, in which said mathematically combining the first set of failure data with the second set of failure data includes employing Bayes' Theorem to combine the first and second sets of failure data.

7. The method as set forth in claim 5, in which the first and second sets of failure data each include at least one of:
   data relating to a fleet which includes at least a portion of the facility;
   data relating to an industry which includes the facility;
   data relating specifically to the facility;
   data from an expert;
   data from a manufacturer; and
   another set of failure data resulting from mathematically combining of a pair of sets of failure data.

8. The method as set forth in claim 1, in which said determining the given time includes:
   selecting one of the elements according to a number of criteria;
   identifying a number of failure mechanisms for the selected element; and
   identifying a number of the maintenance activities to correspond with the identified failure mechanisms.

9. The method as set forth in claim 8, in which the criteria include at least one of importance to production, importance to safety, maintenance concerns, regulatory compliance, risk significance, component failure cost significance, and impact on a performance indicator.

10. The method as set forth in claim 8, in which a weighting factor is applied to at least one of the criteria.

11. The method as set forth in claim 8, further comprising, as to at least some of the elements, selecting as the one of the elements a sub-component of an element.

12. The method as set forth in claim 1, in which said calculating a number of expected net savings based upon the assumption of performance of the maintenance activity at the given time includes, for at least some of the maintenance activities, employing the computer in determining at least one of a number of net revenue gains and a number of expenses avoided that correspond with performance of the maintenance activity at the given time.

13. The method as set forth in claim 12, in which said determining at least one of a number of net revenue gains and a number of expenses avoided includes, for at least some of the maintenance activities, basing at least in part the at least one of a number of net revenue gains and a number of expenses avoided upon the failure probabilities of the element.

14. The method as set forth in claim 12, in which said determining a number of net revenue gains includes employing the computer in determining for each of at least some of the number of net revenue gains the product of an average loss of revenue per failure event multiplied with one of the changes in probability of failure.

15. The method as set forth in claim 12, in which said determining a number of expenses avoided includes employing the computer in determining for each of at least some of the number of expenses avoided the product of an average expense per failure event multiplied with one of the changes in probability of failure.

16. The method as set forth in claim 1, in which said determining the given time includes, as to at least some of the maintenance activities, determining a maintenance interval for the maintenance activity.

17. The method as set forth in claim 16, in which the facility has an expected lifetime, and in which said determining a maintenance interval for the maintenance activity includes employing the computer in calculating a net present value of the expected net savings resulting from an assumption that the maintenance activity is performed at each of the maintenance intervals throughout the expected lifetime of the facility.

18. The method as set forth in claim 1, in which, as to at least some of the maintenance activities, said determining the given time includes employing the computer in identifying a time range within which the performance of the maintenance activity will achieve a substantially maximum net present value from the resulting expected net savings.

19. The method as set forth in claim 1, in which said determining the given time includes employing the computer in:
   determining whether or not the substantial maximum of the net present values is a negative amount; and
   refraining from planning to perform of the maintenance activity if the substantial maximum of the net present values is a negative amount.

20. The method as set forth in claim 1, in which said determining the given time includes employing the computer in planning the performance of the maintenance activity at the time of substantially maximum net present value.

21. The method as set forth in claim 20 wherein said outputting comprises displaying on a chart the planned maintenance activities and the times for performance thereof.

22. The method as set forth in claim 21, in which said displaying on a chart includes listing on the chart the element, the nature of the maintenance activity to be performed with respect to the element, and the time for performance of the maintenance activity.

23. The method as set forth in claim 22, in which said displaying on a chart includes displaying the information in a graphical form.

24. A method of employing a computer in determining whether or not to plan the performance a maintenance activity that relates to an element of a facility, the method comprising:
   employing the computer in:
      determining a number of failure probabilities of the element based upon an assumption of performance of the maintenance activity at a given time,
      employing at least some of the number of failure probabilities in determining a number of changes in probability of failure of the element based upon the assumption of performance of the maintenance activity at the given time, and
      employing at least some of the number of changes in probability of failure in calculating a number of expected net savings based upon the assumption of performance of the maintenance activity at the given time;
   employing the computer in performing said determining, employing, and calculating for each of a number of assumed given times of performance of the maintenance activity;
   for each given time, employing the computer in calculating a net present value of the expected net savings;

employing the computer in identifying the maximum amount among the net present values;

employing the computer in determining whether the maximum amount is a positive amount or a negative amount; and outputting from the computer a plan for the proactive performance of the maintenance activity that is based at least in part upon said determining whether the maximum amount is a positive amount of a negative amount.

25. The method as set forth in claim 24, further comprising employing the computer in planning the performance of the maintenance activity based substantially upon whether the maximum amount is a positive amount or a negative amount.

26. The method as set forth in claim 25, in which said planning the performance of the maintenance activity includes planning the performance of the maintenance activity only if the maximum amount is a positive amount.

27. The method as set forth in claim 26, in which said planning the performance of the maintenance activity includes employing the computer in planning the performance of the maintenance activity at the given time corresponding with the maximum amount.

28. The method as set forth in claim 24, in which said determining a number of failure probabilities includes employing the computer in mathematically combining a first set of failure data with a second set of failure data to form a posterior set of failure data.

29. The method as set forth in claim 28, in which said mathematically combining the first set of failure data with the second set of failure data includes employing Bayes' Theorem to combine the first and second sets of failure data to form the posterior set of failure data.

30. The method as set forth in claim 29, in which the first set of failure data is characterized by a first Weibull distribution, in which the second set of failure data is characterized by a second Weibull distribution, and in which the posterior set of failure data is characterized by a posterior Weibull distribution.

31. The method as set forth in claim 28, in which the first and second sets of failure data each include at least one of:
    data relating to a fleet which includes at least a portion of the facility;
    data relating to an industry which includes the facility;
    data relating specifically to the facility;
    data from an expert;
    data from a manufacturer; and
    another set of failure data resulting from mathematically combining of a pair of sets of failure data.

32. The method as set forth in claim 24, in which said calculating a number of expected net savings based upon the assumption of performance of the maintenance activity at the given time includes employing the computer in determining at least one of a number of net revenue gains and a number of expenses avoided that correspond with performance of the maintenance activity at the given time.

33. The method as set forth in claim 32, in which said determining at least one of a number of net revenue gains and a number of expenses avoided includes basing the at least one of a number of net revenue gains and a number of expenses avoided at least in part upon the failure probabilities of the element.

34. The method as set forth in claim 32, in which said determining a number of net revenue gains includes employing the computer in determining for each of at least some of the number of net revenue gains the product of an average loss of revenue per failure event multiplied with one of the changes in probability of failure.

35. The method as set forth in claim 32, in which said determining a number of expenses avoided includes employing the computer in determining for each of at least some of the number of expenses avoided the product of an average expense per failure event multiplied with one of the changes in probability of failure.

36. A method of employing a computer in maintaining a facility, the facility including a number of elements, the method comprising:
    selecting a number of the elements according to a number of criteria;
    identifying a number of failure mechanisms for the selected elements;
    developing a number of the maintenance activities to correspond with the failure mechanisms;
    for each maintenance activity, employing the computer in:
        determining a number of failure probabilities of an element based upon an assumption of performance of the maintenance activity at a given time,
        employing at least some of the number of failure probabilities in determining a number of changes in probability of failure of the element based upon the assumption of performance of the maintenance activity at the given time, and
        employing at least some of the number of changes in probability of failure in calculating a number of expected net savings based upon the assumption of performance of the maintenance activity at the given time;
    employing the computer in performing said determining, employing, and calculating for each of each of a number of assumed given times of performance of the maintenance activity;
    for each of at least some of the maintenance activities, employing the computer in determining the given time in which the corresponding expected net savings result in a substantially maximum net present value; and
    outputting from the computer a plan for the proactive performance of a number of the maintenance activities that is based at least in part upon said determining the given time.

37. The method as set forth in claim 36, in which, as to at least some of the maintenance activities, said determining the given time includes employing the computer in determining a monetary expenditure at the given time for the maintenance activity, and further including employing the computer in determining, for each of a number of given times, a sum of the monetary expenditures planned to be made at the given time based upon the maintenance activities planned to be performed at the given time.

38. The method as set forth in claim 37, in which a budget amount is associated with each given time, and in which, as to at least some of the maintenance activities, said determining the given time includes employing the computer in identifying the maintenance activities at the given time in which:
    the corresponding expected net savings result in a substantially maximum net present value; and
    the sum of the related monetary expenditures planned to be made at the given time is no greater than the budget amount associated with the given time.

39. The method as set forth in claim 38, in which said identifying the maintenance activities includes, as to at least some of the maintenance activities, employing the computer in considering a profitability index associated with the maintenance activity.

40. The method as set forth in claim 36, in which said determining the given time includes employing the computer in planning the performance of the maintenance activity at the time of substantially maximum net present value.

41. The method as set forth in claim 40, further comprising performing the maintenance activities substantially as planned.

42. An apparatus for optimizing the timing of a number of maintenance activities that relate to a number of elements of a facility, the apparatus comprising a computer having stored thereon software which, when executed on the computer, causes the computer to perform operations comprising:
- determining a number of failure probabilities of an element based upon an assumption of performance of a maintenance activity at a given time,
- employing at least some of the number of failure probabilities in determining a number of changes in probability of failure of the element based upon the assumption of performance of the maintenance activity at the given time, and
- employing at least some of the number of changes in probability of failure in calculating a number of expected net savings based upon the assumption of performance of the maintenance activity at the given time;
- performing said determining, employing, and calculating for each of a number of assumed given times of performance of the maintenance activity;
- determining the given time at which the corresponding expected net savings result in a substantially maximum net present value; and
- outputting a plan for the proactive performance of the maintenance activity that is based at least in part upon said determining the given time.

* * * * *